Patented May 15, 1934

1,958,469

UNITED STATES PATENT OFFICE 1,958,469

ALIPHATIC ACID ANTIOXIDANTS

Ludwig J. Christmann, Jersey City, and Charles J. Romieux, Elizabeth, N. J., assignors to American Cyanamid Company, New York, N. Y., a corporation of Maine No Drawing. Application September 27, 1929, Serial No. 395,745

4 Claims. (Cl. 18—50)

This invention relates to compounds having the property of retarding or preventing the oxidation of organic compounds. Such anti-oxidants find considerable use in various industrial applications, such as for the preservation of perishable organic compounds and the prevention of deterioration of vulcanized rubber materials.

We have discovered that a series of compounds, which might be termed amino aliphatic acids, have properties which adapt them for the above purpose. Generally we utilize compounds in which the aliphatic acid radicle contains less than 10 carbon atoms, and we have found that an acid containing 3 carbon atoms is very much suited for our purposes. The amino radicle may be combined with an aryl group.

The compounds which we contemplate may be considered as having most probably the following structural formula:

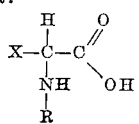

in which R represents an aryl group or hydrogen, and X represents an alkyl group having a relatively small number of carbon atoms or hydrogen.

More specifically we have found that compounds such as alphaanilidopropionic acid or similar compounds, such as salts or amides thereof, are especially suitable. Among compounds of this character we have successfully used alpha naphthylaminopropionic acid and its salts. This compound may be prepared in the following manner:

Into 315 parts of sulphuric acid (90 per cent) we add slowly with rapid agitation and with cooling to prevent the temperature from rising above 30° C. 85 parts of finely ground alpha naphthylaminopropionitrile. The temperature is allowed to rise to 35° C. and is maintained at approximately this point until substantially all of the nitrile has disappeared, which requires about six hours. The disappearance of the nitrile may be determined when a small amount of the reaction mixture is added to water. The nitrile being insoluble in water will form a white precipitate, the absence of which indicates that the nitrile has been converted.

The reaction mass is then diluted with 400 parts by weight of water and heated to the boiling point to cause hydrolysis of the amide to take place forming the acid. The completion of this phase of the reaction may be determined by adding a few drops of the mixture to dilute ammonia solution and noting whether a precipitate appears. When no more precipitate is formed in such a test the reaction is complete. The solution is then cooled and treated with ammonium hydroxide to cause precipitation of the ammonium salt of the acid. This precipitate may be purified by heating, whereby it goes into solution, adding dilute sulphuric acid with very rapid agitation, causing the precipitation of a brown tar, which is present as an impurity. The addition of sulphuric acid is continued until a faint white precipitate begins to form. The hot solution is treated with activated carbon and filtered. The hot filtered solution is then treated with sufficient sulphuric acid to precipitate all of the desired alpha naphthylaminopropionic acid.

This compound may be recrystallized from alcohol and it has a melting point of 159° to 161° C. When added in small amounts to a rubber composition which is subsequently vulcanized, it has been found to exert very strong anti-oxidant properties. Inorganic salts and amides, such as the anilide thereof, also gives very favorable results.

Although we have described our invention giving specific examples of a few compounds which we have found to be effective for the purposes specified our invention is not to be limited by such examples, but the scope thereof is considered to be of a broader character as set forth in the claims appended hereto. In the claims the term "salt" is intended to include not only the inorganic salts, but also the amides and substituted amides, as well as the acids themselves which may be considered as the hydrogen salts of the acids.

What we claim is:

1. An oxidizable organic composition containing an antioxidant comprising alpha naphthylaminopropionic acid.

2. A rubber composition containing an antioxidant comprising alpha naphthylaminopropionic acid.

3. A method of preserving rubber which comprises subjecting it to vulcanization in the presence of a material having the probable formula

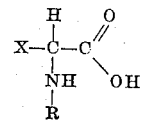

in which X is hydrogen or a simple unsubstituted aliphatic group containing not more than eight carbon atoms and R is a naphthalene group.

4. A method of preserving rubber which comprises subjecting it to vulcanization in the presence of a material having the probable formula

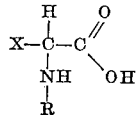

in which X is hydrogen or a methyl group and R is a naphthalene group.

LUDWIG J. CHRISTMANN.
CHARLES J. ROMIEUX.